United States Patent [19]
Walton

[11] 3,781,565
[45] Dec. 25, 1973

[54] SYNCHRONIZING PULSE GENERATOR FOR COMMUNICATION NETWORK

[75] Inventor: William Byron Walton, Battle Creek, Mich.

[73] Assignee: Clark Equipment Company, Buchanan, Mich.

[22] Filed: July 3, 1972

[21] Appl. No.: 268,425

[52] U.S. Cl. .............................................. 307/106
[51] Int. Cl. .......................................... H03k 3/64
[58] Field of Search.................. 307/106, 107, 108, 307/109

[56] References Cited
UNITED STATES PATENTS
| | | | |
|---|---|---|---|
| 3,443,120 | 5/1969 | Thiele | 307/106 |
| 3,143,698 | 8/1964 | Rockafellow | 323/18 |
| 3,486,029 | 12/1969 | Barrett et al | 250/217 |

*Primary Examiner*—Robert K. Schaefer
*Assistant Examiner*—M. Ginsburg
*Attorney*—Kenneth C. Witt et al.

[57] ABSTRACT

This is a pulse forming circuit for producing uniform height, uniform width, control pulses from a three-phase 60 cycle commercial power source. The power for this pulse forming circuit is obtained from a transformer having three separate output windings electrically spaced 120° from each other. Each of these output windings is center tapped to ground and provided with a carrier signal rejection network and a pair of diodes to form a full wave rectifier circuit for each phase of the three-phase signal. Each full wave rectified signal is applied to the base of a transistor to render it conductive except when the signal approaches zero, at which time the transistor is rendered non-conductive so that a voltage pulse is generated at the collector of the associated transistor. The voltage pulses thus produced at each of the three transistors are combined in a network to produce a signal that controls a fourth transistor to thereby produce a one millisecond pulse signal with a pulse repetition frequency of 360 cycles per second and an amplitude limited by a zener diode. The output of this pulse forming network may be used to energize a light emitting diode which in turn energizes a light sensitive element in a control circuit. One use of this circuit is to provide synchronous clock pulses in a transmit-receive communication network.

9 Claims, 1 Drawing Figure

PATENTED DEC 25 1973 3,781,565
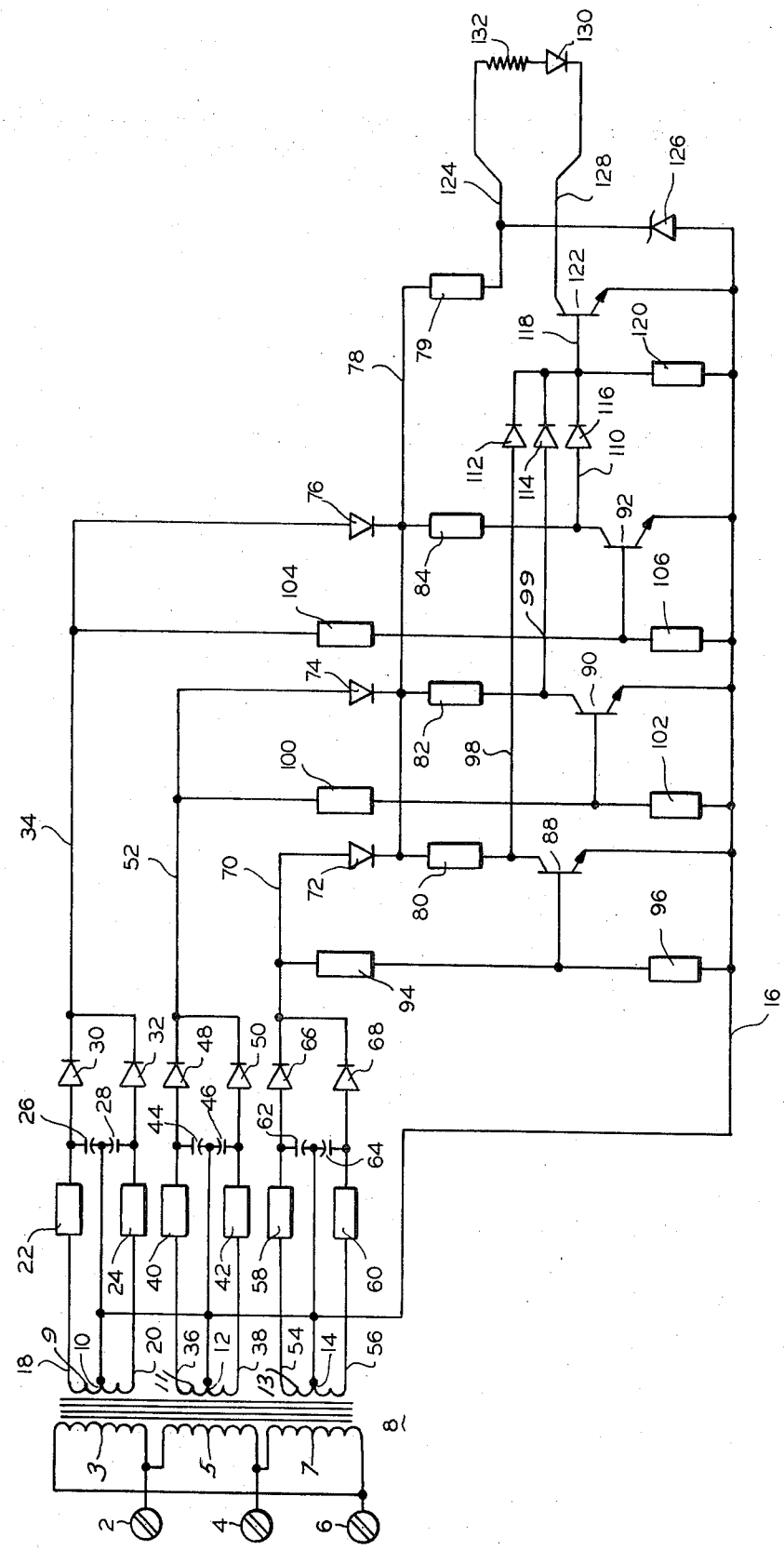

SYNCHRONIZING PULSE GENERATOR FOR COMMUNICATION NETWORK

BACKGROUND OF THE INVENTION

This invention relates to a pulse generating network and particularly relates to a network for generating short duration pulses of uniform height and pulse repetition frequency from a commercial three-phase power source. One particular embodiment of the present invention uses a 60 cycle three-phase 440 volt power source to produce a signal having one millisecond pulse of uniform height and a pulse repetition frequency of 360 cycles per second. One particular use of the present invention is to control a transmit-receive circuit to permit a single circuit to transmit and receive bits of control information on a time sharing basis.

Certain of the prior art illustrates the use of a 60 cycle commercial circuit as the synchronizing control and the power source for a pulse generating network.

Piezo-electric crystals have been previously used as a frequency control for pulse generating networks in which either a direct current or alternating current power source is used.

Other pulse generating circuits use a commercial alternating current power source to provide the desired pulse repetition frequency.

DC power sources with various forms of multivibrators and pulse shaping circuits are also found in the prior art.

The prior art pulse generating circuits are either too expensive, too complex, or do not have the proper control of pulse repetition frequency and pulse shape.

SUMMARY OF THE PRESENT INVENTION

The present invention provides a fixed amplitude, fixed pulse width, fixed repetition frequency, pulse generating circuit utilizing a standard three-phase commercial source both as a frequency control means and as a power source. This invention utilizes three substantially equivalent solid state circuits, one for each phase of the power source to produce three pulse signals, each having a pulse repetition frequency of 120 cycles per second. It utilizes three substantially equivalent circuits, one for each phase of the power source with the pulses in each circuit shifted 120 electrical degrees from the pulses in each of the other two circuits. The circuit in the present invention then combines these pulses to generate synchronizing pulses with a pulse repetition frequency equal to six times the base frequency of the three-phase commercial current utilized. In the case of a 60 cycle power source, the pulse repetition frequency is 360 cycles per second.

It is, therefore, an object of the present invention to provide a pulse generating network utilizing a commercial three-phase electrical source to provide both power and pulse repetition frequency control for the network.

It is also an object of the present invention to provide a synchronizing pulse generator for a communication network to permit transmit and receive on a time-sharing basis over a single communication circuit.

It is a further object of the present invention to provide a simple generator for producing pulses of a predetermined height ad pulse repetition frequency.

It is still another object of the present invention to provide a simple economic pulse generation network.

Other objects of the present invention will become apparent from inspection of the drawing and reading of the specification and will be pointed out particularly in the claims.

DESCRIPTION OF THE PREFERRED EMBODIMENT

The instant invention will be described with reference to the attached single-FIGURE schematic drawing of the pulse generator circuitry.

Referring now to the drawing, 2, 4, and 6 are terminals connected to a three-phase power system in which the phases are spaced 120 electrical degrees from each other. In one particular embodiment of this invention this power source is a 60 cycle, three-phase 440 volt power source. 8 is a three-phase transformer having primaries 3, 5 and 7 electromagnetically connected to secondaries 9, 11 and 13, respectively. The center taps 10, 12 and 14 of the transformer's secondaries 9, 11 and 13, respectively, are connected together and connected to electrical ground 16. The end terminals 18 and 20 of the secondary 9 are connected to resistors 22 and 24, respectively, and through these resistors and condensers 26 and 28 to ground 16. These condensers and resistors form a high frequency rejecting network that bypasses any high frequency spurious signals to ground so that these signals are not sensed by the remainder of the circuit. Diodes 30 and 32 rectify the primary frequency signal from terminals 18 and 20 to produce a full wave rectified signal in the conductor 34. The cathodes of these two diodes are connected together and the wave formed at the cathodes with respect to the ground 16 is a full wave rectified alternating current signal of 120 half cycles per second.

The terminals 36 and 38 of the transformer 11 are likewise connected to resistors 40 and 42, respectively, and these resistors and condensers 44 and 46 form a filter to reject to ground high frequency spurious signals which may be generated in the transformer secondary 11. The diodes 48 and 50 complete the full wave rectifier so that a full wave rectified current signal of 120 half cycles per second is produced in the line 52. The rectified signal produced in line 52 is 120° out of phase with the signal produced in the line 34.

Terminals 54 and 56 of the transformer 13 are similarly connected to 58 and 60 and through these resistors and condensers 62 and 64 and diodes 66 and 68 to produce in the line 70 a full wave rectifed signal similar to that produced in the lines 34 and 52, but 120° out of phase with the similar signal produced in the lines 34 and 52.

In this way similar unidirectional half cycle signals are produced in each of the above-mentioned lines 34, 52 and 70, having a frequency of 120 half cycles per second and they are out of phase with each other by 120°.

The full wave rectified signals thus formed in lines 34, 52 and 70 are combined to diodes 72, 74 and 76 to form in the line 78 a rectified signal which is a combination of the signals appearing in 34, 52 and 70 and becomes an undulating direct current signal. This substantially DC voltage is applied to the collector electrodes of transistors 88, 90 and 92 through resistors 80, 82 and 84, respectively.

The single phase, full wave rectified signal in the line 70 is impressed upon the base electrode of the transistor 88 through resistor 94 and across resistor 96.

The transistors 88, 90 and 92 each have their emitter directly tied to electrical base 16.

The full wave rectified signal in the line 70 goes to zero every half cycle or 120 times per second and thus the base electrode of the transistor 88 goes to zero 120 times per second. The collector electrode of the transistor 88 is energized through the resistor 80 from the substantially DC voltage in the line 78. THe energization of the base electrode of the transistor 88 results in the collector electrode of this transistor being effectively tied to ground at all times except when the voltage applied to the base electrode is below the cutoff voltage of the transistor. Therefore, it may be seen that the voltage produced in the line 98 is effectively at ground except when the voltage in the line 70 approaches zero making the transistor 88 nonconducting, at which time diode 112 will become conductive. Therefore, current pulses of approximately 1 millisecond appear in he line 98 at a rate of 120 pulses per second.

In a similar manner, the full wave rectifed signal in the line 52 produced from the second phase of the three-phase source is impressed through the resistor 100 and across the resistor 102 onto the base electrode of the transistor 90, thereby producing pulses of electricity in the line 99 having a pulse width of 1 millisecond and a pulse repetition frequency of 120 pulses per second.

Likewise, the full wave rectified signal produced in the line 34 by the third phase of the three-phase electrical source is impressed through the resistor 104 and across the resistor 106 onto the base of the transistor 92 to thereby produce in the line 110 pulses 1 millisecond in width with a pulse repetition frequency of 120 pulses per second.

The positive pulses of current thereby formed in the lines 98, 99 and 110 are 60 electrical degrees apart. These pulses are fed through the diodes 112, 114 and 116, respectively, to produce in the line 118 equally spaced positive pulses of current that are 1 millisecond in width and have a pulse repetition frequency of 360 pulses per second.

The undulating voltage in line 78 is fed across the resistor 79 into the line 124 and thence across the zener or tunnel diode 126 to thereby produce in the line 124 a fixed positive voltage, the magnitude of which is determined by the conducting characteristics of the diode 126.

The positive pulses of voltage produced in the line 118 are fed across the resistor 120 to the base of the transistor 122. Except when these positive pulses are present, the transistor 122 is nonconducting and, therefore, the voltage in the line 128 is equal to substantially the same positive voltage as that appearing in the line 124 (as controlled by the diode 126). When the transistor 122 is made conducting by a positive pulse in the line 118, the voltage in the line 128 drops to substantially the ground potential of line 16.

This difference in voltage appearing between the lines 124-128 causes current to flow through the resistor 132 and the light emitting diode 130 to thereby produce a resulting voltage pulse across the resistor 132 and the resulting light pulse from the diode 130 of 1 millisecond in width with a pulse repetition frequency of 360 pulses per second.

If it is desired to isolate the circuit controlled by the pulses, a light sensitive element is used in the controlled circuit and made responsive to the light emitting diode 130. If it is not necessary to isolate the controlled circuit, then the voltage produced across the resistor 132 may be used as the controlling electrical pulse.

ELECTRICAL IDENTIFICATION AND VALUE OF ELEMENTS

The resistors in the circuit have the following values: 22, 24, 40, 42, 58 and 60 are 100 ohm resistors; 94, 100, 104 are 3,300 ohm resistors; 80, 82, 84, 96, 102, 106 and 120 are 1,500 ohm resistors; and 79 is a 2,000 ohm resistor.

The capacitors or condensers in the circuit have the following values: 26, 28, 44, 46, 62 and 64 are 0.5 microfarad condensers.

The diodes in the circuit are as follows: 30, 32, 48, 50, 66, 68, 72, 74, 76, 112, 114, and 116 are all 1N4004 diodes.

126 is a 1N4744A zener diode.

The transistors in the circuit are all NPN transistors of the following types: 88, 90 and 92 are 2N903 transistors.

122 is an MSPU06 transistor.

The value of the resistor 132 and the type of light emitting diode 130 are selected as desired for a particular application.

OPERATION OF PREFERRED EMBODIMENT

The transformer 8 produces from a standard three-phase 440 volt power circuit three single phase 60 cycle signals in the secondaries, 9, 11 and 13, which are 120 electrical degrees displaced from each other. These single phase electrical signals are rectified to produce full wave rectified signals in the lines 34, 52 and 70, respectively. The diodes 76, 74 and 72 combine these rectified voltages into a typical three-phase full wave rectified voltage wave form. The important characteristic of this wave form is that it never goes below a substantially high positive voltage and undulates between this voltage and the peak voltage of the individual rectified voltage signals. These undulations are removed by the resistor 79 and the tunnel diode 126 to produce a substantially constant direct voltage with positive potential in the line 124, determined by characterictics of the diode 126.

The full wave rectified signals in 34, 52 and 70 are fed respectively to the base transistors 92, 90 and 88 to change each of these transistors from a conducting to a nonconducting status. When the transistors 92, 90 and 88 are nonconducting, the voltage in the lines 110, 99 and 98, respectively approach the voltage of the line 78, thus producing positive pulses of voltage. Since the voltages in 34, 52 and 70 approach zero 120 times per second, respectively, then the resulting pulses in the lines 110, 99 and 98 each have a pulse repetition frequency of 120 pulses per second. These pulses are combined by diodes 116, 114 and 112 to produce in the line 118 a series of pulses positive in polarity and with a pulse repetition frequency of 360 pulses per second.

The transistor 122 is nonconducting except when a positive pulse is introduced to the base thereof by the line 118. Therefore, the voltage in the line 128 is substantially the same as that in 124 except when this positive pulse is introduced on the base of the transistor 122. Therefore, there appears in the line 128 a series of pulses going negative from the potential of the line 124 to approximately the potential of the line 16 or ground potential. Each time a negative pulse is introduced to the line 128 current flows through the resistor 132 and the light emitting diode 130. This produces a pulse of voltage across the resistor 132 and a flash of light from the light emitting diode 130 at a pulse repetition frequency of 360 times per second. Either this pulse of voltage or this flash of light can be used for the master control of a communication network. In one particular application of the present invention, a light sensitive element is placed in the communication network to be controlled and located so as to be actuated by the flash of light from the light emitting diode 130. This method of operation permits the communication network to be isolated from the pulse generating network which is the subject of the present invention.

In describing the invention, the preferred embodiment has been shown and described but it is obvious to one skilled in the art that there are many variations, combinations, alterations and modifications that may be made without departing from the spirit of the invention or from the scope of the appended claims. The embodiments of the invention for which an exclusive property or privilege is claimed are defined as follows:

I claim:

1. A circuit for producing from a standard commercial three-phase alternating current source equi-spaced short duration pulses of electrical energy comprising:
    a source of three-phase commercial voltage,
    means connected to said source of three-phase commercial voltage for producing first, second and third alternating current voltage signals spaced 120 electrical degrees from each other,
    first, second and third full wave rectifying means connected to said first named means for rectifying said first, second and third alternating current signals to form three full wave rectified signals spaced 120 electrical degrees from each other,
    combining means connected to said first, second and third full wave rectifying means for combining said three full wave rectified signals to produce a substantially direct current voltage,
    first, second and third pulse forming networks connected to said first, second and third full wave rectifying means for respectively forming a short duration electrical pulse when the associated full wave rectified signal is below a predetermined amplitude,
    means connected to said first, second and third pulse forming networks for combining the pulses produced by said first, second and third pulse forming networks to produce a signal having a pulse repetition frequency equal to three times the pulse repetition frequency of the signal produced by each of said pulse forming networks.
    means connected to said last-mentioned means for inverting the pulses combined by said last-mentioned means and impressing said inverted pulses on a first output terminal, and
    means connected with said combining means for impressing said substantially direct current voltage on a second output terminal,
    whereby pulses of substantially equal amplitude and with a pulse repetition frequency equal to six times the base frequency of said three-phase commercial source are produced between said first and said second output terminals.

2. A circuit as claimed in claim 1 wherein said combining means includes a zener diode to maintain said substantially DC voltage at a fixed amplitude.

3. A circuit as claimed in claim 1 in which each of said pulse forming networks includes:
    an NPN transistor with means for impressing an associated full wave rectified signal on the base of each said transistor; and
    means for applying said substantially direct current voltage on the collector electrode of each transistor.

4. A circuit as claimed in claim 1 in which each of said full wave rectifying means includes a filter capable of excluding spurious high frequency electrical signals from each full wave rectified signal.

5. A circuit as claimed in claim 3 in which the collector electrodes in said first, second and third pulse forming networks are connected respectively to the P crystal of first, second and third PN diodes and the N crystals of said diodes are connected together.

6. A circuit as claimed in claim 5 in which the N crystals of the PN diodes are connected to the base electrode of an NPN transistor and the collector electrode is connected to said second output terminal.

7. An electrical pulse producing network including:
    a source of full wave rectified electrical voltage having a ground, circuit means connected with said source of full wave rectified electrical voltage for changing the rectified voltage into substantially direct current voltage.
    a transistor having an emitter electrode, a collector electrode and a base electrode,
    said source of full wave rectified electrical voltage connected to said base electrode,
    said circuit means connected to said collector electrode,
    and said emitter electrode connected to ground, whereby a positive pulse of electrical voltage is produced between said collector electrode and said emitter electrode when the voltage impressed on said base electrode is less than the cut-off voltage of said transistor.

8. An electrical pulse producing network as claimed in claim 7, in which:
    said transistor is an NPN transistor.

9. An electrical pulse producing network as claimed in claim 7, in which:
    said source of full wave rectified electrical voltage comprises a rectifier for a 60 cycle power circuit.

* * * * *